United States Patent [19]

Sharpe

[11] Patent Number: 5,459,457
[45] Date of Patent: Oct. 17, 1995

[54] PAGING OR OTHER SELECTIVE CALL SYSTEM WITH BATTERY POWER CONSERVATION

[75] Inventor: Anthony K. Sharpe, Cambridge, United Kingdom

[73] Assignee: U.S. Philips Corporation, New York, N.Y.

[21] Appl. No.: 280,752

[22] Filed: Jul. 26, 1994

Related U.S. Application Data

[63] Continuation of Ser. No. 996,205, Dec. 23, 1992, abandoned.

[30] Foreign Application Priority Data

Feb. 3, 1992 [GB] United Kingdom ............... 9202249

[51] Int. Cl.$^6$ .................. H04Q 7/00; H04Q 7/02; H04B 1/16
[52] U.S. Cl. ............... 340/825.44; 370/106; 340/825.52; 455/38.3; 455/343
[58] Field of Search .................. 340/825.44, 825.48, 340/825.52, 311.1; 370/106; 455/38.3, 343

[56] References Cited

U.S. PATENT DOCUMENTS

| | | | |
|---|---|---|---|
| 4,996,526 | 2/1991 | De Luca | 340/825.44 |
| 5,144,296 | 9/1992 | De Luca et al. | 340/825.44 |
| 5,230,084 | 7/1993 | Nguyen | 455/38.3 |

FOREIGN PATENT DOCUMENTS

| | | | |
|---|---|---|---|
| 2086106 | 5/1982 | United Kingdom | H04B 1/10 |
| WO8805248 | 7/1988 | WIPO | |
| WO9006634 | 6/1990 | WIPO | |

*Primary Examiner*—Donald J. Yusko
*Assistant Examiner*—Edward Merz
*Attorney, Agent, or Firm*—Leroy Eason

[57] ABSTRACT

Selective call systems such as the CCIR Radiopaging Code No. 1 (or POCSAG) have a signal format of successive data batches, each batch having a synchronization codeword followed by a 8 data frames. Each pager is assigned to a frame in every batch, resulting in a battery power conservation duty cycle of 1:8. The invention enables any number of the pagers to operate in accordance with a preselected longer duty cycle. Every N (N>2) successive batches constitute a superbatch, and a pager is assigned to only one or certain ones of the frames thereof. To provide superbatch synchronization a predetermined codeword (PCW) is transmitted in one frame of one batch, preferably the first, of the entire superbatch. A pager energizes its receiving section to receive the PCW codeword, based thereon synchronizes to the batch and super batch, then de-energizes its receiving section for a predetermined interval T1 until reception of the its assigned frame, after which it de-energizes again for another predetermined interval T2 until the PCW codeword of the next succeeding superbatch is received. If N=16, a battery power conservation duty cycle of 1:128 can be achieved. Since the PCW codeword is only transmitted once in every N batches, it does not significantly effect the standard signal format and so the system is transparent to pagers which are to operate at the conventional 1:8 duty cycle. Also, since the synchronization codewords are not effected, rapid recovery of synchronization is retained following deep fade or loss of the transmitted carrier.

10 Claims, 3 Drawing Sheets

5,459,457

PAGING OR OTHER SELECTIVE CALL SYSTEM WITH BATTERY POWER CONSERVATION

This is a continuation of application Ser. No. 07/996,205, filed Dec. 23, 1992, now abandoned.

BACKGROUND OF THE INVENTION

1. Field of the Invention

The present invention relates to battery powered selective call systems such as a paging systems and particularly to such a system which provides enhanced battery power conservation.

For convenience of description the present invention will be described in the context of the CCIR Radiopaging Code No. 1 (otherwise known as POCSAG) which is described in detail in "The book of the CCIR Radiopaging Code No. 1" published by the Radiopaging Code Standards Group (RCSG) and obtainable from British Telecom, Radiopaging, London, England. However the invention may be applied to systems using other digital paging codes.

2. Description of the Related Art

As is well known POCSAG has an inherent battery power conservation signal format which comprises for each new transmission a preamble of 576 bits, which serves to enable a paging receiver to obtain bit synchronization and a plurality of concatenated batches of bits. Each batch comprises a synchronization codeword, which enables a pager to obtain word synchronization, and 8 frames each comprising 2 codewords. A control device in a pager is preprogrammed with the number of the frame in which an alert signal comprising the pager's identity codeword (RIC) will, when necessary, be transmitted. Accordingly, after achieving bit synchronization, the receiver section of a pager only requires to be energised for two periods in each batch; firstly, to receive the synchronization codeword and, secondly, for the duration of the pre-designated frame in order to be able to receive its RIC, if transmitted. During the time intervals between the end of the synchronization codeword and the start of the pre-designated frame, assuming that it is not the first frame, and between the end of the pre-designated frame and the end of the batch, the receiving section can be de-energized for a period equivalent to 7 frames thereby achieving a battery saving duty cycle of 1:8. A clock included in the control device controls the energization of the receiving section. For pocket size pagers which are able to hold relatively large capacity batteries, for example two size AAA batteries, the battery power conservation feature of the POCSAG signal format enables an acceptable battery life to be achieved.

However for some special applications, for example where a pager is built into a wristwatch, relatively small and expensive lithium batteries are used to energize the pager. Accordingly there is a desire to increase the battery economizing aspect of the pager if necessary at the expense of service.

Various proposals are known to enhance the conservation of battery power. For example PCT specification WO 90/06634 discloses conserving power during the transmission of predetermined signals such as the synchronization codeword. This method requires examining the first 8 bits of the 32 bit synchronization codeword as received, and if it contains less than two bit errors, the complete codeword is assumed to have been received correctly and the control device switches off the receiving section until the pre-designated frame in the same batch. Such a method requires resetting the clock interval. However, if the first 8 bits contain two or more bit errors, then the receiving section has to remain energised to receive the entire synchronization codeword and either the remaining 24 bits are checked for errors or the entire codeword is checked for errors.

Another proposal, disclosed in PCT specification WO 88/05948, is the creation of what may be termed a "superbatch" comprising N POCSAG batches, where N=16. In order to be able to identify each batch in a superbatch, the synchronization codeword is given an identity comprising say a four bit binary word ranging from 0 to 15. The synchronization identity is appended to the synchronization codeword.

The control device in the pager is then preprogrammed to energize the receiving section to receive one or more of the N synchronization codewords in a superbatch together with the pre-designated frame in the associated batch or batches. Thus in the case of say a wristwatch pager, the receiving section may be energized firstly to receive the synchronization codeword and secondly for the duration of a subsequent frame in order to be able to receive its RIC, if transmitted, in one batch in every 16 batches, thus achieving a battery saving duty cycle of 1:128. In other applications, more than one batch in a superbatch may be used, which however leads to a corresponding reduction in the battery saving duty cycle. In the case of a normal pager which is able to operate in all the batches, it has to receive and decode all the synchronization codewords and their identities. That means that not only must the receiving section be powered up longer in order to receive the additional bits, but also the option disclosed in WO 90/06634 cannot be used. Furthermore, a paging system in which synchronization codeword identities are appended to the synchronization codeword is not compatible with the normal POCSAG system, which means that this proposal is not transparent to users not wishing to apply the enhanced battery power conservation technique.

SUMMARY OF THE INVENTION

An object of the present invention is to facilitate the conservation of battery power by one or more classes of users in a selective call system in a manner which is substantially transparent to other classes of users.

According to one aspect of the present invention there is provided a selective call system comprising a base station and a plurality of receivers, wherein the base station transmits signals in accordance with a signal format including. a succession of batches, each batch commencing with a synchronization codeword followed by a predetermined integral number, n, of frames, each frame having a duration corresponding to the transmission of at least one receiver identity code. Each receiver comprises a receiving section and a control section which includes means for controlling the energization of the receiving section, In one of every N batches, where N is an integer of at least 2, the base station transmits a predetermined codeword in a preselected one of the n frames, and at least one of the receivers is controlled by its control section to energize its receiving section to receive said predetermined codeword. The control section, in response to receiving said predetermined codeword de-energizes the receiving section for a predetermined period and thereafter re-energizes it for a duration corresponding to at least one frame in at least one predetermined batch of the N batches.

The system in accordance with the present invention uses the predetermined codeword to provide a time reference for those receivers, that is pagers, which are operating according to a battery power conservation regime which has a duty cycle which is greater than that which is inherent in the basic signal format of the system, for example 1:8 in the case of POCSAG. The system in accordance with the present invention is transparent to normal users of the POCSAG system and has only marginal effect on those pagers whose identity codes (or RICs) are transmitted in the frame, say the first frame, of the batch in which the predetermined codeword is transmitted by the base station. This is because only one in for example 16 batches is affected and in the affected batch there is still the option of using the second codeword of the POCSAG frame to transmit an identity code.

Furthermore, as the synchronization codeword is normal to the system and recognizable by all classes of users, known techniques such as that disclosed in European Patent 0 118 153 B1 can be used to recover batch synchronization whenever a signal is lost due to a deep fade and/or carrier loss.

Battery power conservation may be enhanced in several ways. For example the base station may be controlled to transmit pager identity codes in an ordered sequence, say decreasing numerical significance. The control section of a pager, on determining that a received identity code follows its own identity code in the sequence, de-energizes its receiving section prior to expiration of its frame.

In an alternative arrangement the identity codes of those receivers operating according to a particular battery power conservation regime may contain a prefix unique to those receivers considered as a group. The control section of a pager, upon determining that the received bits corresponding to the bit positions of a prefix do not correspond to the prefix contained in its identity code, de-energizes its receiving section prior to the expiration of its frame.

In the event a group of receivers operating with the same battery power conservation regime becomes too large, a second group may be formed and assigned to another batch.

The system in accordance with the present invention is flexible to implement because the assignment of the pagers to particular frames in one or more of the N batches can be done by appropriately preprogramming the control section of a pager and loading corresponding information into the base station. Thus a variety of battery power conservation regimes can be provided, all of which are transparent to other users of the system.

According to a second aspect of the present invention there is provided a selective call receiver for use in the system according to the first aspect of the present invention, the receiver comprising a receiving section and a control section. The control section includes means for storing a synchronizing codeword, an identity codeword and a predetermined codeword which is used by the control section to operate the receiver in accordance with a predetermined battery power conservation regime, and timing means for controlling the energization of the receiving section. In response to the control section detecting receipt of said predetermined codeword the receiving section is de-energized until expiration of a first predetermined time period, after which it is energized for the duration of a frame, and thereafter it is de-energized until the expiry of a second predetermined period whereafter it is again energized to receive the synchronization codeword of the batch containing said predetermined codeword, the sum of said first and second predetermined periods exceeding the duration of a batch.

BRIEF DESCRIPTION OF THE DRAWINGS

The present invention will now be described, by way of example, with reference to the accompanying drawings, wherein.

In the drawings the same reference numerals have been used to illustrate corresponding features.

DESCRIPTION OF THE PREFERRED EMBODIMENTS

Figure 1:
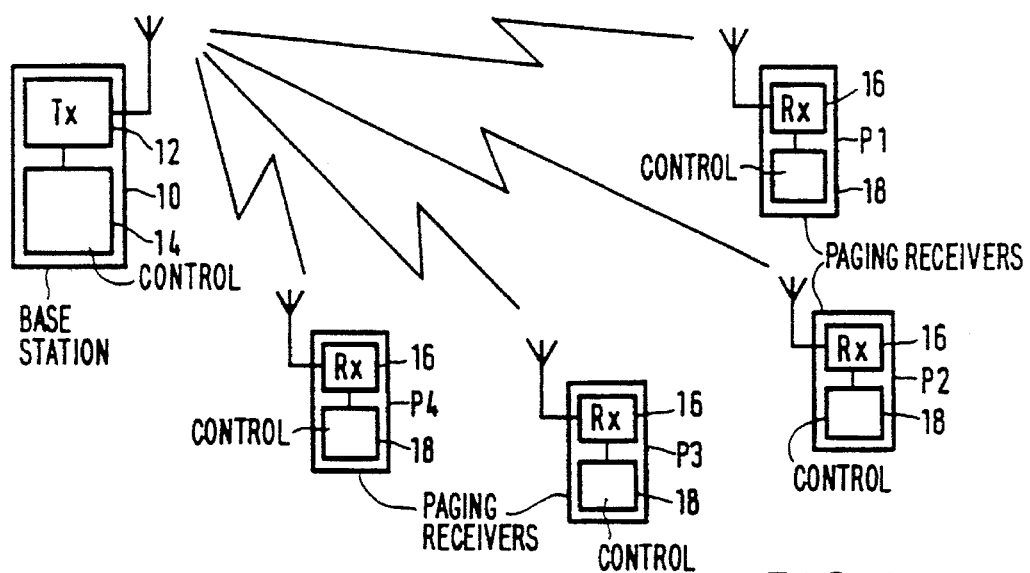
FIG. 1 is a diagram illustrating a selective call system.

The selective call system shown in FIG. 1 comprises a base station 10 which is equipped with a transmitter 12 and a controller 14 which includes means for formatting signals to be transmitted. The signals may comprise pager identity codes (RICs) and/or message data.

A plurality of paging receivers (or pagers) P1 to P4 are provided. The pagers are able to roam in and out of the coverage area of the transmitter 12. Each pager P1 to P4 includes a receiving section 16 tuned to the frequency of the transmitter 12 and a control section 18 which controls the energization of the receiving section and the energization of an alerting device, (not shown) for example an acoustic, visual and/or tactile transducer, in the event of the control section identifying the pager's RIC in a transmitted message.

Figure 2:
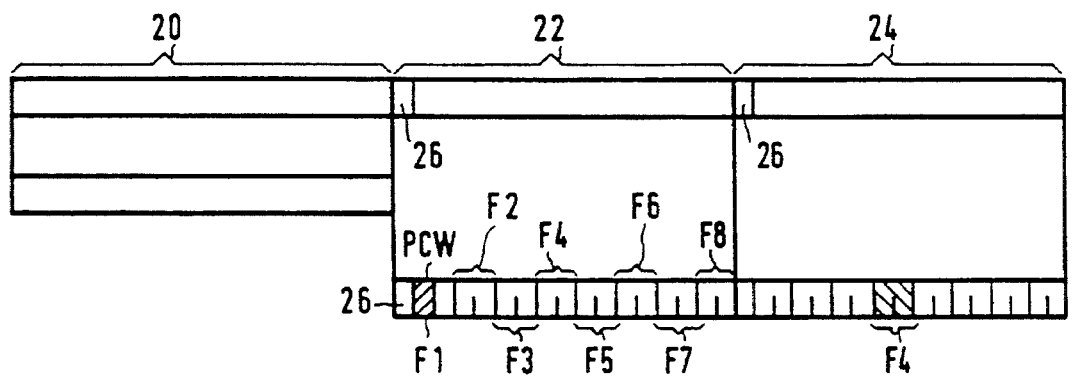
FIG. 2 is a diagram of the POCSAG signal format.

The signal format is POCSAG or CCIR Radiopaging Code No. 1, and for the sake of completeness it will be described briefly with reference to FIG. 2. However, for full information, reference may be made to "The book of the CCIR Radiopaging Code No. 1" mentioned above. The transmissions from the base station 10 comprise a series of bursts, each burst comprising a preamble 20 of 576 bits which serve to enable the pagers P1 to P4 achieve bit synchronization, followed by concatenated batches of codewords formed by RICs and data messages. For convenience of description the transmission of data messages will not be described. Each batch 22,24 is arranged identically and comprises seventeen 32-bit codewords. The first codeword 26 is a synchronization codeword which is used by a pager to achieve/maintain word synchronization. The remaining sixteen codewords are paired and each of the eight pairs is termed a frame, F1 to F8. Thus there are eight frames per batch. Each pager is assigned to a particular frame and its RIC will be transmitted in that frame, say frame F4, and no other. Thus, as part of the inherent battery power conservation feature of POCSAG, the pager must energize its receiving section 16 firstly to be able to receive the synchronization codeword and secondly for the duration of its frame, in this example F4. For the duration of the other frames, that is F1 to F3 and F5 to F8, the receiving section 16 can be de-energized.

As mentioned above there are classes of pagers, such as wristwatch size pagers, which are powered by relatively expensive, low capacity batteries. Accordingly, in order to extend the battery life, a still more economical battery power conservation regime is required.

Figure 3:
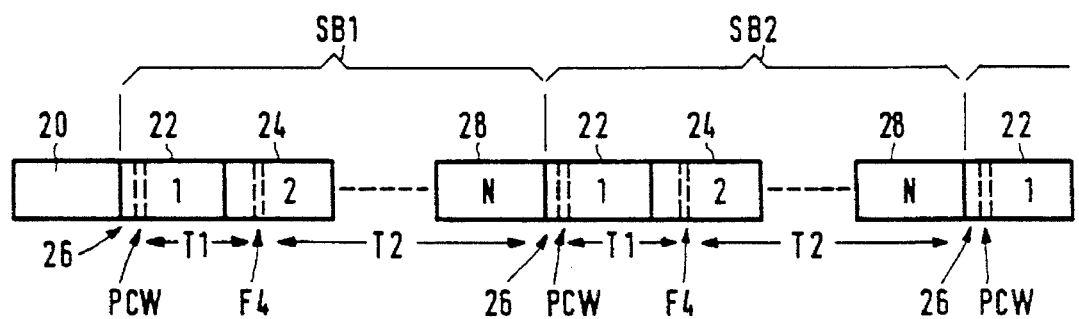
FIG. 3 is a diagram illustrating a superbatch signal format.

Referring to FIG. 3, every N, where N is an integer of two or more, say 16, batches form a superbatch; SB1, SB2 and so on. A pager wishing to follow a battery power conservation duty cycle of say 1:128, that is 1 frame in every 16 batches, is assigned to a particular frame in one batch, say frame F4 in the second of the 16 batches, that is batch 24 in FIG. 2. Also, this information will be stored in the controller 14 (FIG. 1) of the base station 10, which controller is programmed to operate in accordance with the POCSAG format. In order for a pager to know that it is correctly synchronized with the superbatch structure, a predetermined codeword PCW is transmitted by the base station as the first codeword in the frame F1 of the first batch 22 of each superbatch SB1, SB2 and so on.

At the beginning of a new transmission from the base station 10, the receiving section of a pager operating according to a long duty cycle power conservation regime is energized to receive the preamble 20 in order to gain bit synchronization, then the synchronization codeword 26 in the first batch 22 and the codeword PCW. It is then de-energized for a first predetermined period T1, after which is it again energized for the duration of its assigned frame F4 in the batch 24. Thereafter the receiving section is de-energized for a second predetermined period T2 which terminates substantially at the end of the Nth batch 28, after which it is again energized to receive the synchronization codeword at the beginning of the next superbatch SB2 together with the predetermined codeword PCW. This cycle continues to the end of the transmission. The durations of the periods T1 and T2 are stored in the control section of the pager, which section also includes a timing means.

This system is flexible because it can accommodate pagers wanting to operate at other duty cycles. If the number of pagers wanting to operate at the same duty cycle exceeds a value which would impair the performance of the system, then any new pagers wanting to operate at that same duty cycle can be assigned to the same or a different frame in another batch and the periods T1 and T2 are set accordingly. In the case of a pager operating in accordance with the 1:8 duty cycle inherent in POCSAG, it will be energized to receive only the synchronization codeword and for the duration of its assigned frame in each batch. There is no requirement for such a pager having to receive the predetermined codeword PCW. The addition of the codeword PCW to the base station transmissions will not affect unduly the performance of the system because it is only transmitted in 1 of every N batches and only requires half of a frame, the other half being available for the transmission of a RIC.

Figure 4:
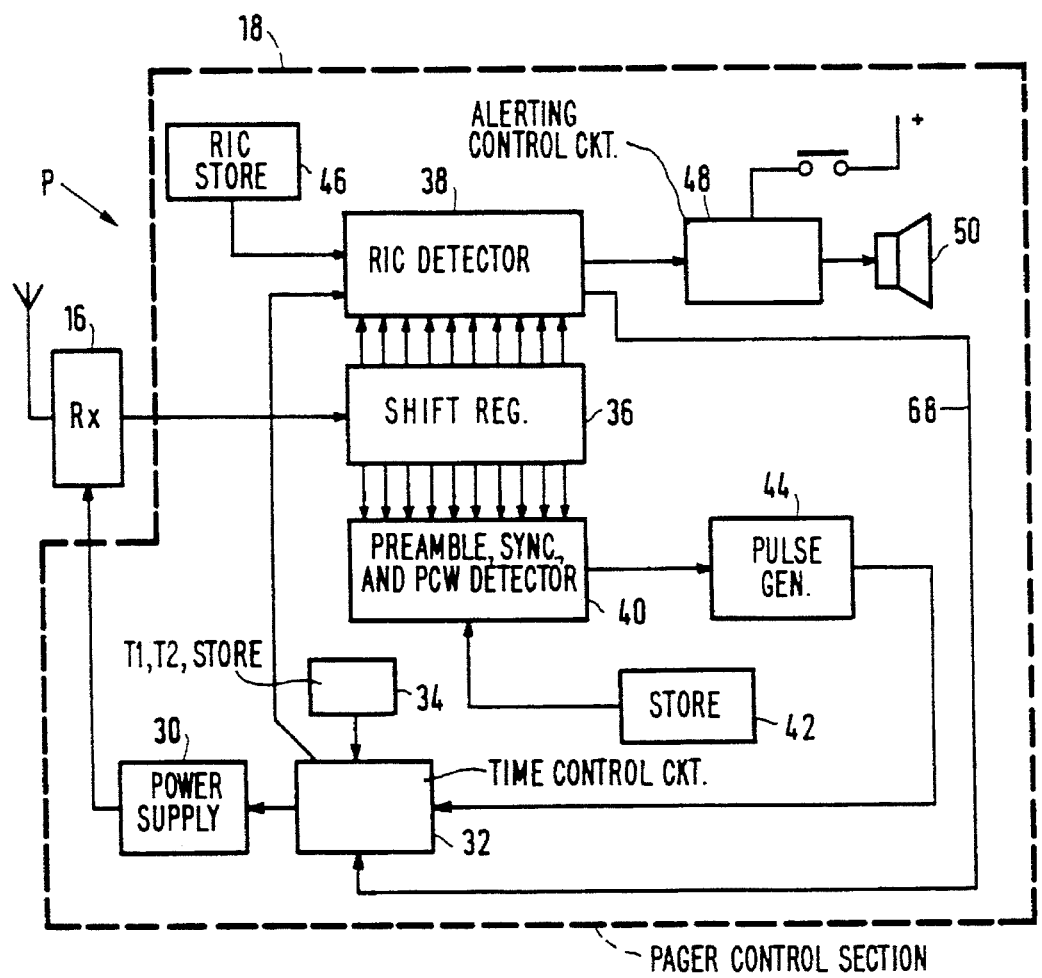
FIG. 4 is a simplified block schematic diagram of a pager.

FIG. 4 is a block schematic diagram of an embodiment of a pager P which is intended to operate at a battery power saving duty cycle of 1:128. The paging receiver P comprises a receiving section 16 and a control section 18. The receiving section 16 can be of any suitable design, for example one based on the Philips low power digital paging receiver IC UAA 2033T or UAA 2050T. The control section 18 may be based on the Philips PCA 5000T decoder. The control section 18 is energized continuously during the period of use, but the receiving section 16 is energized and de-energized by a power control circuit 30 which in turn is controlled by a time control circuit 32 which includes non-volatile memory means 34 for storing the on and off periods for the receiving section. A thirty-two stage shift register 36 is coupled to an output of the receiving section 16. Outputs of each of the stages of the shift register 36 are coupled to a RIC detector 38 and to a detector 40 for detecting preamble 20, the synchronization codeword 26 and the predetermined codeword PCW. In the interests of clarity not all 32 outputs have been shown. A non-volatile store 42 is connected to the detector 40 and stores the preamble bit pattern, the synchronization codeword and the codeword PCW, which are presented as required to the detector 40. An output of the detector 40 is connected to a pulse generator 44 which produces an output indicative of the detection of one of the mentioned signals by the detector 40. This output is supplied to the timer control circuit 32 which determines in accordance with the data stored in its memory means 34 whether power should be supplied or not supplied to the receiving section 16. For example, on receipt of a signal indicative of the receipt of the codeword PCW, the time control circuit 32 signals the power control circuit 30 to interrupt the power supply to the receiving section for the period T1. Thereafter power is supplied for the required frame period, that is frame F4 in batch 24, after which it is interrupted for the period T2.

An address store 46, which stores the RICs allocated to the pager, normally there are 4 RICs, is coupled to the address detector 38. An output of the detector 38 is connected to an alert control circuit 48 which controls the energization of one or more transducers, such as an acoustic transducer 50. The timing control circuit 32 has an output coupled to the address detector 38. If one of the pager's RICs is identified, the detector 38 produces an output in response to which the circuit 48 causes the transducer 50 to be energized.

Figure 5:
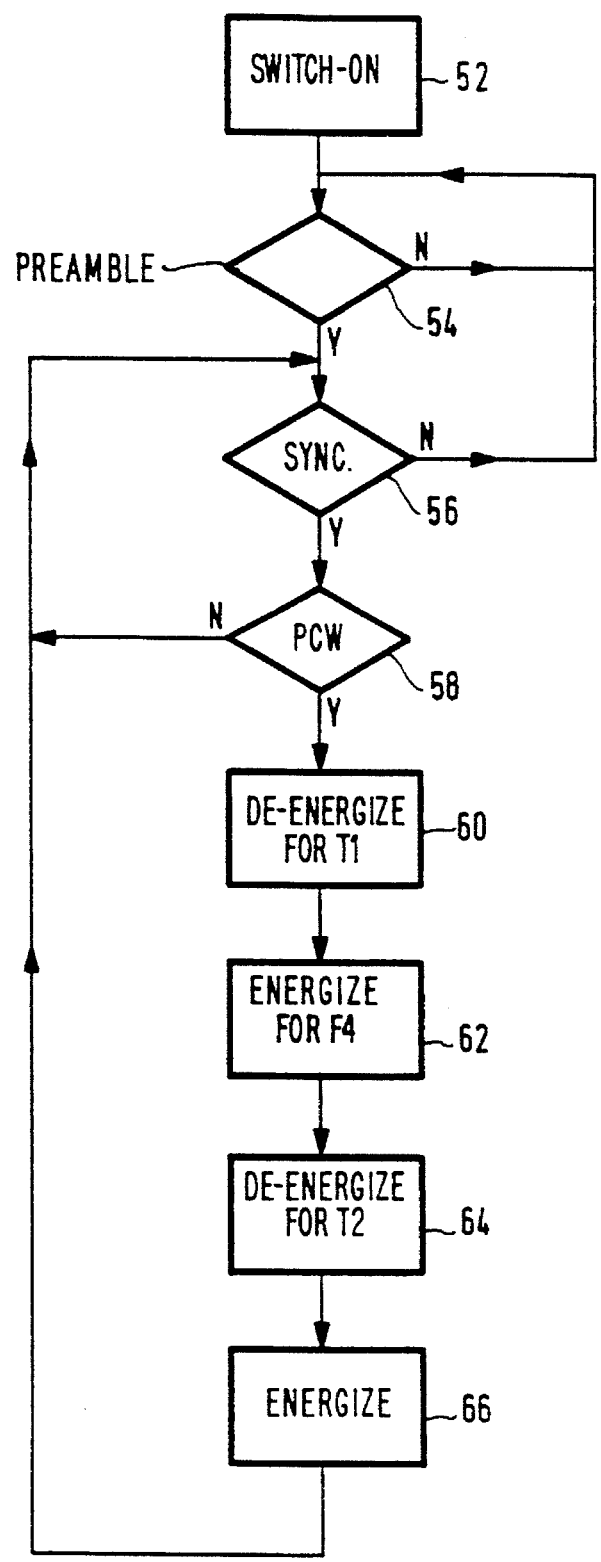
FIG. 5 is a flow chart illustrating the battery power conservation routine.

FIG. 5 is a simplified flow chart of the superbatch battery power conservation method disclosed. The flow chart begins with switching on the pager, rectangle 52. Then a check is made to see if a preamble has been received, decision block 54. If it has not been received, N, then the process returns to looking for preamble. If it has been received, Y, then the process proceeds to decision block 56 which relates to "Has the synchronization codeword been detected?" If not, N, then the process reverts to detecting a preamble. If the synchronization codeword has been received, Y, then the process proceeds to decision block 58. The block 58 checks whether the predetermined codeword, PCW, has been received. If not, N, the process reverts to block 56, but if it has, Y, then the receiving section 16 is de-energized for the period T1, process block 60. Process block 62 relates to the energization of the receiving section 16 for the duration of its assigned frame F4 in the superbatch. Process block 64 relates to the de-energization of the receiving section 16 for the period T2. Finally process block 66 relates to the energization of the receiving section 16 in order to be able to receive the synchronization codeword at the commencement of the next concatenated superbatch, decision block 56.

In the event of a deep fade or carrier lost situations, the pager can adopt any suitable routine for recovering synchronization, for example that disclosed in European Patent Specification 0 118 153 B1. However, in recovering synchronization it is necessary to identify the predetermined codeword PCW in order to determine the beginning of the superbatch and thereby set the time control circuit 32 accordingly.

The time control circuit 32 includes a clock circuit (not shown). If more sophisticated battery power regimes are adopted, such as those to be described in the following, then the time periods stored in the memory means may have to be varied to enhance power conservation.

In one refinement, the base station 10 transmits the RICs it has for a particular frame in an ordered sequence, for example beginning with the highest RIC and decreasing. If the RIC address detector 38 determines from the first few bits of an address that it relates to a RIC which would follow after its own RIC in the sequence, it can signal the timer control circuit on a line 68 to de-energize the receiving section for the remainder of the frame. This requires the timer control circuit 32 to increase the period T2 by the balance of the frame period.

If the base station rigorously follows the ordered sequence for the duration of its transmission, the receiving section could be de-energized for its entire frame after it has determined that any subsequent RICs transmitted will be after its position in the sequence. However, provision may have to be provided to cope with emergencies, for example, by the predetermined codeword containing a flag instructing all pagers to energize their receiving sections for the duration of their assigned frames.

Another refinement comprises assigning a unique prefix to the RICs of those pagers wanting to practice the same battery power conservation regime. If a pager wanting to follow that regime does not detect this prefix, which is transmitted at the beginning of its assigned frame, it de-energizes its receiving section 16 immediately and the duration of the period T2 is modified by the addition of the balance of the frame period.

Neither of these refinements will affect the operation of a normal POCSAG pager.

From a reading of the present application, other modifications will be apparent to persons skilled in the art. Such modifications may involve other features which are already known in the design, manufacture and use of selective call systems and receivers and component parts thereof, and which may be used instead of or in addition to features already described herein. Although this application describes particular combinations of features, it should be understood that the scope hereof includes any novel feature or any novel combination of features disclosed herein either explicitly or implicitly, or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features in one or more further application derived herefrom.

I claim:

1. A selective call system comprising a base station and a plurality of receivers, wherein the base station transmits data signals in accordance with a signal format which includes successive data batches, each batch commencing with a synchronization codeword followed by a predetermined integral number of successive data frames; each receiver having an identity codeword which when the receiver is called, is transmitted by the base station in a frame assigned to said receiver in one or more batches; each receiver comprising a receiving section and a control section for controlling energization of the receiving section; said system being characterized in that:

the base station is adapted to transmit a predetermined codeword (PCW) in a preselected one of the frames of a preselected one of every N successive batches, where N≧2, and;

the control section of at least one of the receivers is adapted to energize and de-energize the receiving section of said receiver so that:

i) the receiving section is energized during said preselected frame of each preselected batch to receive the PCW codeword;

ii) the receiving section is de-energized for a predetermined period (T1) following said preselected frame until occurrence of a frame assigned to said receiver; and iii) the receiving section is energized again during said assigned frame, then de-energized again for a further predetermined period (TS) until occurrence of a succeeding frame assigned to said receiver or of synchronization codeword of a succeeding batch which a PCW codeword, whichever occurs first.

2. A system as claimed in claim 1, wherein said preselected batch is the first of every N successive batches and said preselected frame immediately follows the synchronization codeword of said preselected batch.

3. A system as claimed in claim 1, wherein the base station is adapted to transmit identity codewords in an ordered sequence, the identity codewords of at least two receivers being transmitted in a frame commonly assigned thereto in each of said batches; and the control section of at least one of said two receivers, upon detecting in said assigned frame an identity codeword which follows that of said one receiver in said sequence, is adapted to de-energize the receiving section of said one receiver prior to expiration of said assigned frame.

4. A system as claimed in claim 2, wherein the base station is adapted to transmit identity codewords in an ordered sequence, the identity codewords of at least two receivers being transmitted in a frame commonly assigned thereto in each of said batches; and the control section of at least one of said two receivers, upon detecting in said assigned frame an identity codeword which follows that of said one receiver in said sequence, is adapted to de-energize the receiving section of said one receiver prior to expiration of said assigned frame.

5. A system as claimed in claim 1, wherein:

different groups of said receivers operate with respectively different battery conservation regimes, the identity codewords of all receivers in each group having a prefix which is unique to that group; and the control section of each receiver is adapted to determine from the prefix of an identity codeword in a frame assigned to said receiver whether said identity codeword belongs to a group other than that to which said receiver belongs, and in that event to de-energize the receiving section of said receiver prior to expiration of said assigned frame.

6. A system as claimed in claim 2, wherein:

different groups of said receivers operate with respectively different battery conservation regimes, the identity codewords of all receivers in each group having a prefix which is unique to that group; and the control section of each receiver is adapted to determine from the prefix of an identity codeword in a frame assigned to said receiver whether said identity codeword belongs to a group other than that to which said receiver belongs, and in that event to de-energize the receiving section of said receiver prior to expiration of said assigned frame.

7. A system as claimed in claim 1, wherein different groups of said receivers operate with respectively different battery conservation regimes, and the receivers in each group are assigned to frames in respectively different ones of said batches.

8. A receiver for use in a selective call system wherein a base station transmits data signals in accordance with a signal format which includes a succession of data batches, each batch commencing with a synchronization codeword followed by a predetermined integral number of data frames, each receiver having an identity codeword which is transmitted by the base station in a frame assigned to such receiver in one or more batches; the base station also transmitting a predetermined codeword (PCW) in a preselected one of the frames of a preselected one of every N successive batches, where $N \geq 2$; said receiver having a receiving section and a control section; characterized in that said control section comprises:

- means for detecting reception by said receiving section of a synchronization codeword followed by said predetermined codeword (PCW);
- a battery power supply for energizing and de-energizing said receiving section; and
- time control means which, upon reception by said receiving section of said predetermined (PCW) codeword, is adapted to control said power supply so as to:
  (i) de-energize said receiving section for a first predetermined time period (T1) following reception of said predetermined codeword (PEW) until reception of a frame which is assigned to said receiver,
  (ii) energize said receiving section during said assigned frame, and thereafter de-energize it again for a second predetermined period (T2) which continues until reception of a synchronization codeword of a succeeding batch which contains said predetermined codeword (PCW), the sum of said first and second predetermined periods exceeding the duration of a batch.

9. A selective call receiver as claimed in claim 8, wherein said base station is adapted to transmit receiver identity codewords in an ordered sequence, codewords of at least two receivers being transmitted in a frame commonly assigned thereto; and the time control means of at least one of said two receivers comprises means for determining whether an identity codeword in said assigned frame follows an identity codeword of said one receiver in said sequence, and in that event to control said power supply to de-energize the receiving section of said one receiver prior to expiration of said assigned frame.

10. A selective call receiver as claimed in claim 8, wherein different groups of said receivers operate with respectively different battery conservation regimes and the identity codewords of all receivers in each group include a prefix which is unique to that group; and said time control means is further adapted to determine from the prefix of an identity codeword in a frame assigned to said receiver whether said identity codeword belongs to a group other than that to which said receiver belongs, and in that event to de-energize the receiving section of said receiver prior to expiration of said assigned frame.

\* \* \* \* \*

UNITED STATES PATENT AND TRADEMARK OFFICE
CERTIFICATE OF CORRECTION

PATENT NO. : 5,459,457

DATED : October 17, 1995

INVENTOR(S) : Anthony K. Sharpe

It is certified that error appears in the above-indentified patent and that said Letters Patent is hereby corrected as shown below:

Column 3:

Claim 1, line 7, after "of" insert --a--;

line 8, after "which" insert --contains--.

Signed and Sealed this

Twenty-seventh Day of February, 1996

Attest:

BRUCE LEHMAN

Attesting Officer

Commissioner of Patents and Trademarks